(12) United States Patent
Lee et al.

(10) Patent No.: US 7,433,679 B2
(45) Date of Patent: Oct. 7, 2008

(54) APPARATUS AND METHOD OF PROVIDING A HISTORY OF CALLING NUMBERS

(75) Inventors: Sang Yun Lee, Seongnam-si (KR); Hee Hyeok Hahm, Seoul (KR); Tae Wook Park, Seoul (KR); Ki Mun Kim, Incheon-si (KR)

(73) Assignee: SK Telecom Co., Ltd., Seoul (KR)

( * ) Notice: Subject to any disclaimer, the term of this patent is extended or adjusted under 35 U.S.C. 154(b) by 225 days.

(21) Appl. No.: 10/489,164

(22) PCT Filed: Sep. 11, 2002

(86) PCT No.: PCT/KR02/01707

§ 371 (c)(1),
(2), (4) Date: May 7, 2004

(87) PCT Pub. No.: WO03/024143

PCT Pub. Date: Mar. 20, 2003

(65) Prior Publication Data

US 2004/0259543 A1    Dec. 23, 2004

(30) Foreign Application Priority Data

Sep. 12, 2001    (KR) .................. 10-2001-0056260

(51) Int. Cl.
*H04L 12/58*   (2006.01)
*H04M 1/725*   (2006.01)
*H04M 1/663*   (2006.01)
*H04Q 7/22*    (2006.01)
*H04Q 7/20*    (2006.01)

(52) U.S. Cl. .............. 455/412.1; 455/412.2; 455/433; 455/466

(58) Field of Classification Search ............ 455/433, 455/445, 466, 417, 428, 405, 412.1, 412.2, 455/415; 379/111, 112.01, 121.04, 133, 379/134

See application file for complete search history.

(56) References Cited

U.S. PATENT DOCUMENTS

| 6,088,589 | A  | * | 7/2000  | Valentine et al. | ........... 455/433 |
| 6,236,853 | B1 | * | 5/2001  | Mee et al. | ............... 455/414.1 |
| 6,285,875 | B1 | * | 9/2001  | Alajoki et al. | ............. 455/423 |
| 6,311,057 | B1 | * | 10/2001 | Barvesten | ................... 455/415 |

(Continued)

*Primary Examiner*—George Eng
*Assistant Examiner*—Wesley L Kim
(74) *Attorney, Agent, or Firm*—Lowe Hauptman Ham & Berner LLP (57) ABSTRACT

The present invention relates to apparatus and method of providing a history of failed calls for a subscriber who is targeted by the failed calls. In the present invention, when an exchanger can not route a call to a target subscriber it notifies an HLR (Home Location Register) of call routing failure. Then, the HLR sends information about the failed call, which includes the called and the calling number, and call originating time (or call receiving time), to a call control system. The call control system adds the received failed-call information to a calling history for the called number. Afterwards, when the called number is accessible the call control system provides a subscriber of the called number with the calling history, whereby the subscriber can know all of calling numbers that requested to make connections with him or her while he or she was not able to communicate with a mobile network.

15 Claims, 5 Drawing Sheets

*Subscriber List*

| Subscriber A |
| Subscriber B |
| Subscriber C |
| ⋮ |

*Call History For each Subscriber*

| Calling Number (Caller's ID) | Call Time | Reason of Call Fail |
|---|---|---|
| 000-111-2222 | 1.1. 05:10 | — |
| 000-111-3333 | 1.1. 09:34 | — |
| 000-111-4444 | 1.1. 15:32 | Power-off |
| 000-111-5555 | 1.24. 16:32 | Busy |
| 000-111-6666 | 2.5. 11:25 | Not-Pageable |
| 000-111-7777 | 3.6. 14:29 | No Answer |
| ⋮ | ⋮ | ⋮ |

U.S. PATENT DOCUMENTS

| | | | |
|---|---|---|---|
| 6,438,140 B1 * | 8/2002 | Jungers et al. | 370/471 |
| 6,625,437 B1 * | 9/2003 | Jampolsky et al. | 455/405 |
| 6,826,397 B1 * | 11/2004 | Vasa | 455/417 |
| 2005/0032543 A1 * | 2/2005 | Adkins | 455/550.1 |

* cited by examiner

Subscriber List

| Subscriber A |
| Subscriber B |
| Subscriber C |
| ⋮ |

*Call History For each Subscriber*

| Calling Number (Caller's ID) | Call Time | Reason of Call Fail |
|---|---|---|
| 000-111-2222 | 1.1. 05:10 | — |
| 000-111-3333 | 1.1. 09:34 | — |
| 000-111-4444 | 1.1. 15:32 | Power-off |
| 000-111-5555 | 1.24. 16:32 | Busy |
| 000-111-6666 | 2.5. 11:25 | Not-Pageable |
| 000-111-7777 | 3.6. 14:29 | No Answer |
| ⋮ | ⋮ | ⋮ |

FIG. 7 ly, but not by way of limitation, to a method and apparatus for providing a subscriber with information including the calling number and call originating time of every call for the subscriber.

APPARATUS AND METHOD OF PROVIDING A HISTORY OF CALLING NUMBERS

This is a nationalization of PCT/KR02/01707 filed Sep. 11, 2002 and published in English.

TECHNICAL FIELD

The present invention relates generally to a method and apparatus for providing a calling history and, more particularly, but not by way of limitation, to a method and apparatus for providing a subscriber with information including the calling number and call originating time of every call for the subscriber.

BACKGROUND ART

Mobile telecommunications can be defined as mobility-added telecommunications. Mobility includes terminal mobility that removes the limits on the length of a phone line, user mobility that enables a user to communicate using a terminal while moving freely, and service mobility that provides data and video services as well as conventional voice service by utilizing wide-band wireless channels.

With the development of mobile communications technology, mobile terminals such as cellular phones, PCS phones, and PDAs that implement mobile telecommunications are becoming smaller and lighter.

Telecommunications networks provide various services for mobile subscribers. In case a subscriber cannot answer an incoming call and the caller leaves a voice message, the called subscriber can get the voice message afterwards through the voice mail service. A subscriber can use his/her voice to dial a number after registering his/her voice in the mobile terminal having the function of the voice-activated dialing service. The short message service (SMS) enables a subscriber to receive various messages and information through the screen of his/her mobile terminal. Also, the short message service notifies a subscriber of the arrival of a voice mail for the subscriber as soon as a caller leaves a voice message when the called subscriber uses the voice mail service.

When a call is received, a called subscriber is able to know the caller's number immediately by the calling number display service that provides the number of every received call.

The conventional calling number display service provides the numbers of normally connected calls but cannot provide the numbers of calls that were tried but not received by the called subscriber because the called subscriber's terminal is power-off, the called subscriber's line is busy, or the called subscriber is out of the service coverage.

DISCLOSURE OF INVENTION

It is therefore an object of the present invention to provide a method and apparatus for providing calling history information where information about answered and failed calls for a subscriber is managed and provided for the subscriber when the subscriber's mobile terminal is accessible.

In the method and apparatus for providing calling history information in accordance with the invention, if a called subscriber's terminal is not accessible, a home location register is notified of the status and sends the information including the calling and called numbers and call originating or receiving times to a call control system. Receiving the information, the call control system creates calling history information arranged by subscribers and the calling history information is provided to a corresponding subscriber in the form of a message when the subscriber's terminal is accessible.

The method and apparatus for providing calling history information in accordance with the present invention enables a subscriber to obtain the calling number of every call tried while the subscriber's terminal is not accessible. The method can be advantageously employed by public institutes in which the number of incoming calls for reporting various incidents such as crime reports can overrun momentarily.

MODES FOR CARRYING OUT THE INVENTION

In order that the invention may be fully understood, preferred embodiments thereof will now be described with reference to the accompanying drawings.

Figure 1:
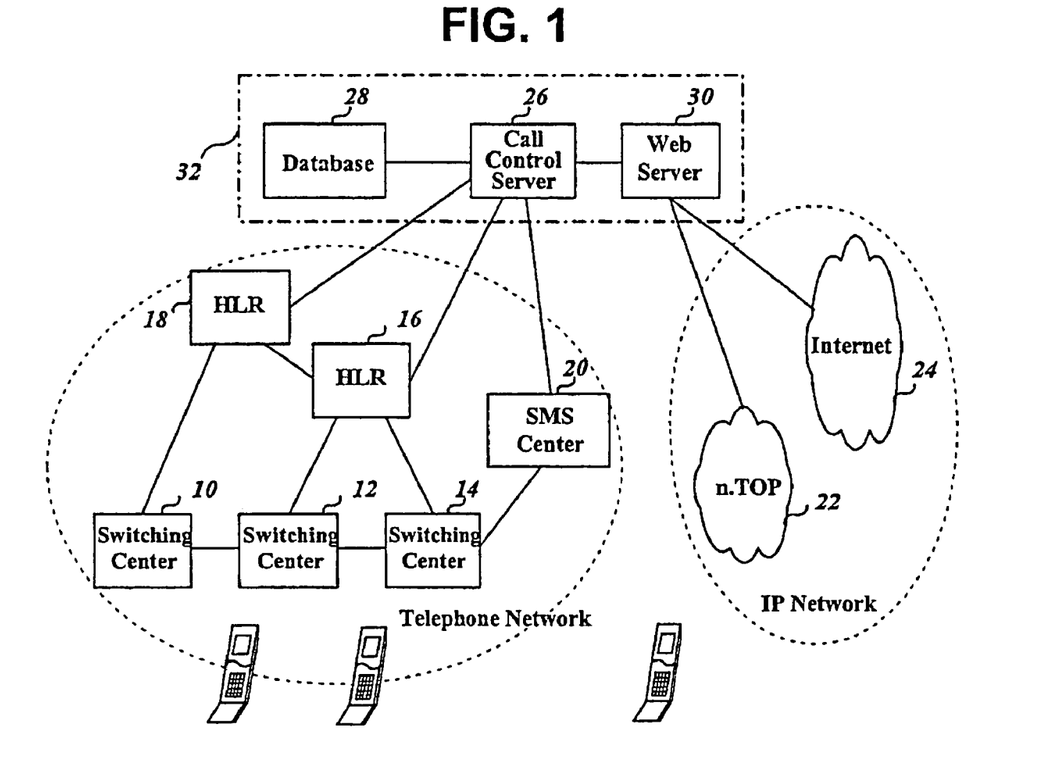
FIG. 1 is a graphical depiction of a network embodying the present invention.

FIG. 1 is a graphical depiction of a network in which the present invention may be advantageously employed, the network comprising a telephone network and an IP network. The telephone network comprises switching centers 10, 12, and 14 for routing a call to a target subscriber, home location registers (HLR) 16 and 18 for storing all the permanent information about mobile terminal users such as terminal information (MIN, ESN), subscriber information, and additional service information, necessary for providing mobile telecommunication services, and a short message service (SMS) center 20 for providing short messages for a subscriber terminal through the switching centers. The IP network comprises the Internet 24 and a mobile internet 22 such as n-Top or NATE service network for providing contents of a specific mobile internet portal site.

A call control system 32 comprising a call control server 26, a database 28, and a web server 30 is present between the telephone network and the IP network. The call control system 32 manages calling history (caller's ID list) information for each of subscribers such as the calling number and originating time of each call for the subscriber, separating answered calls and failed calls. The information about a failed call further includes the reason for the failure such as terminal power-off, busy line, being in a not-pageable region, or no answer.

The call control server 26 communicates with the HLRs 16 and 18 using the Internet Protocol (IP)-based mobile application part (MAP) protocol. Receiving a calling history for a subscriber from the HLRs 16 and 18 when a call to the subscriber occurs, the call control server 26 controls the process of management, storing, and transmission of the calling history, the calling history including calling numbers, call originating times, the reasons for failed calls, etc. Also, the call control server 26 communicates with the short message service center 20 using the short message peer to peer (SMPP) protocol and controls the process of sending the calling history information stored in the database 28 to a corresponding subscriber in the form of short messages through the short message service center 20.

Figure 2:
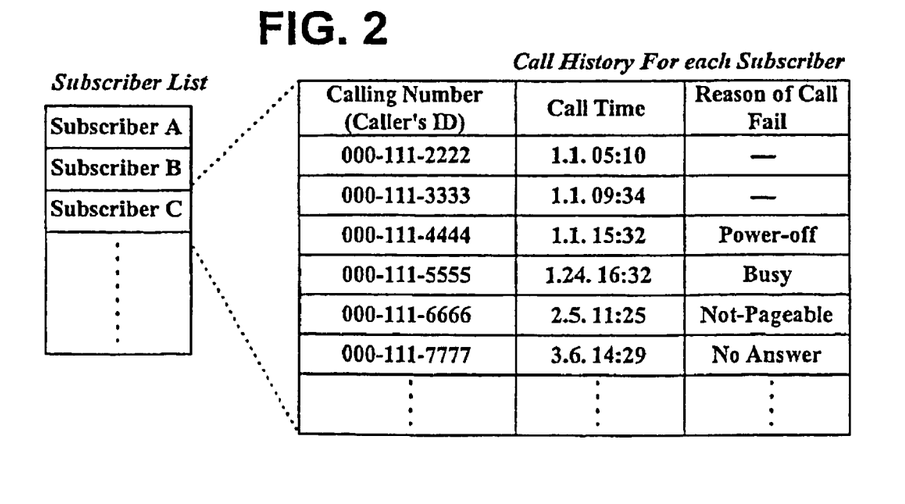
FIG. 2 is an exemplary calling history table stored in the database in FIG. 1.

Controlled by the call control server 26, the database 28 stores the calling history information provided by the HLRs 16 and 18. FIG. 2 depicts an exemplary calling history table (caller's ID list) stored in the database 28, wherein the calling numbers, the call receiving times, and the reasons for failed calls are stored, being arranged by subscribers.

The web server 30, connected to the IP network, receives a request for calling history information from a subscriber through the IP network and sends the request to the call control server 26. Also, receiving the requested calling history information from the call control server 26, the web server 30 provides the received calling history information back to the subscriber.

The call control server 26 creates a short message carrying the calling history information and sends the created short message to the short message service center 20.

The call control server 26 in the call control system 32 makes the calling history information stored in the database 28 transmitted to a corresponding subscriber through the short message service center 20 or the web server 30. In more detail, the call control system 32 provides the information about failed calls stored in the database 28 to a subscriber when the subscriber requests the information through the Internet 24 or the mobile internet 22, and/or periodically sends the calling history in the form of a short message to the subscriber.

In the event of providing the information periodically using a short message, the call control system 32 sends the corresponding subscriber the number of failed calls along with ARS numbers, an address of internet menu access or a web site where more detailed information can be obtained. The information is provided to the subscriber in the form of a short message every 4 or 6 hours, in which the subscriber can modify the notification period. Then, the subscriber obtains more specific calling history information using the provided access information at his or her convenience.

The method of periodically sending the number of failed calls and relevant access information by a short message might be inconvenient in that the subscriber receiving the message needs to access the web server afterwards to attain the more specific information. As an alternative method, it is possible to include calling numbers, call originating times, the reasons for failed calls, etc in the short message and provide the short message containing all the necessary information periodically.

On detecting that the mobile terminal of a subscriber is turned on, the call control system 32 notifies the subscriber of the information about calls that were not answered while the mobile terminal is turned off. The HLRs 16 and 18 notify the call control server 26 in the call control system 32 of the state change that the mobile terminal is turned on. Then, the call control server 26 immediately sends the number of failed calls and relevant access information for obtaining more specific information to the subscriber in the form of a short message without regard to the predefined notification period. In this case, it is also possible to include all the detailed information such as the calling numbers, call originating times and the reasons for failed calls in the short message.

The notification of the reasons for failed calls is optional for the call control system 32.

Figure 6:
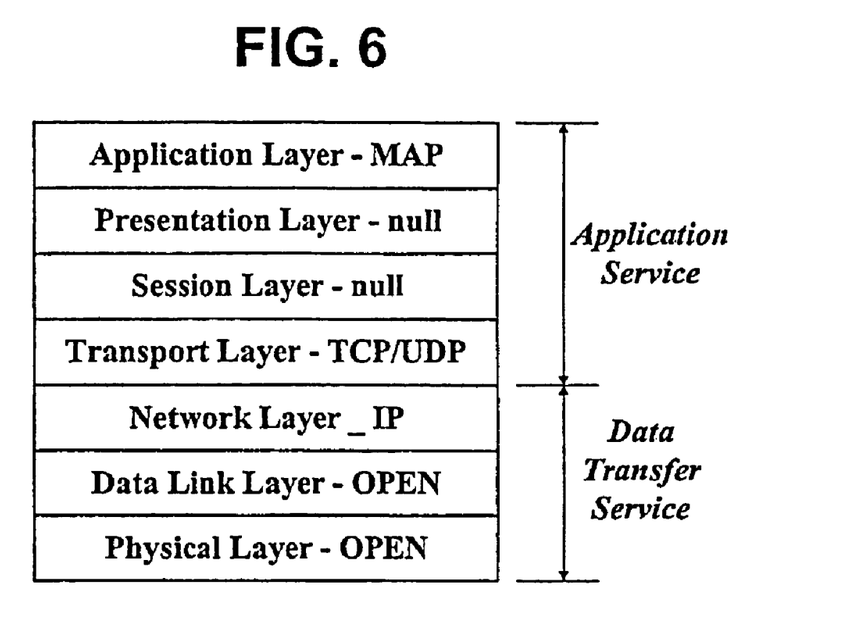
FIG. 6 is a pictorial representation of a protocol stack used for the communication between the home location register and call control server in FIG. 1.

The communications between the HLRs 16 and 18 and the call control server 26 are performed based on the IP-based MAP protocol. FIG. 6 shows the IP-based MAP protocol stack comprising 7 layers, the 1st physical layer—OPEN, the 2nd data link layer—OPEN, the 3rd network layer—IP, the 4th transport layer—TCP/UDP, the 5th session layer—NULL, the 6th presentation layer—NULL, and the 7th application layer—MAP. The layers from the 1st physical layer to the 3rd network layer are for data transfer services and the upper layers are for application services.

Figure 7:
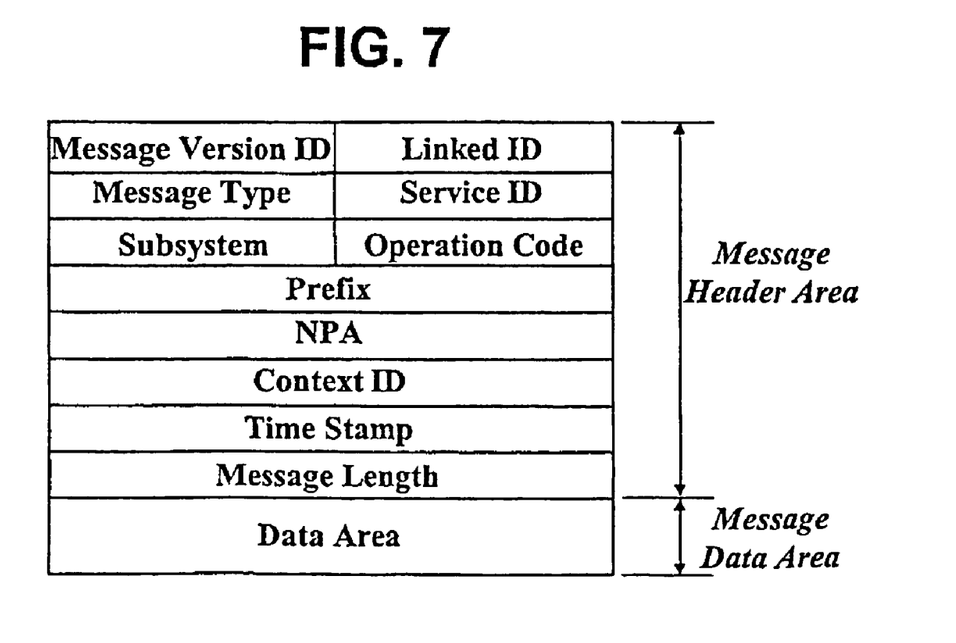
FIG. 7 is a pictorial representation of an exemplary format of the message exchanged between the home location register and call control server in FIG. 1

FIG. 7 depicts the format of the message exchanged between the HLRs 16 and 18 and the call control server 26, the message comprising a message header area and data area. The message header area contains a message version ID, a linked ID, a message type, a service ID, a subsystem, an operation code, a prefix, a number plan area (NPA), which is a service provider ID, a context ID, a source ID, a time stamp, and a message length. The calling history information is stored in the data area.

The preferred embodiments of the present invention are described with reference to the network shown in FIG. 1 and the flow diagrams shown in FIGS. 3~5.

Figure 3:
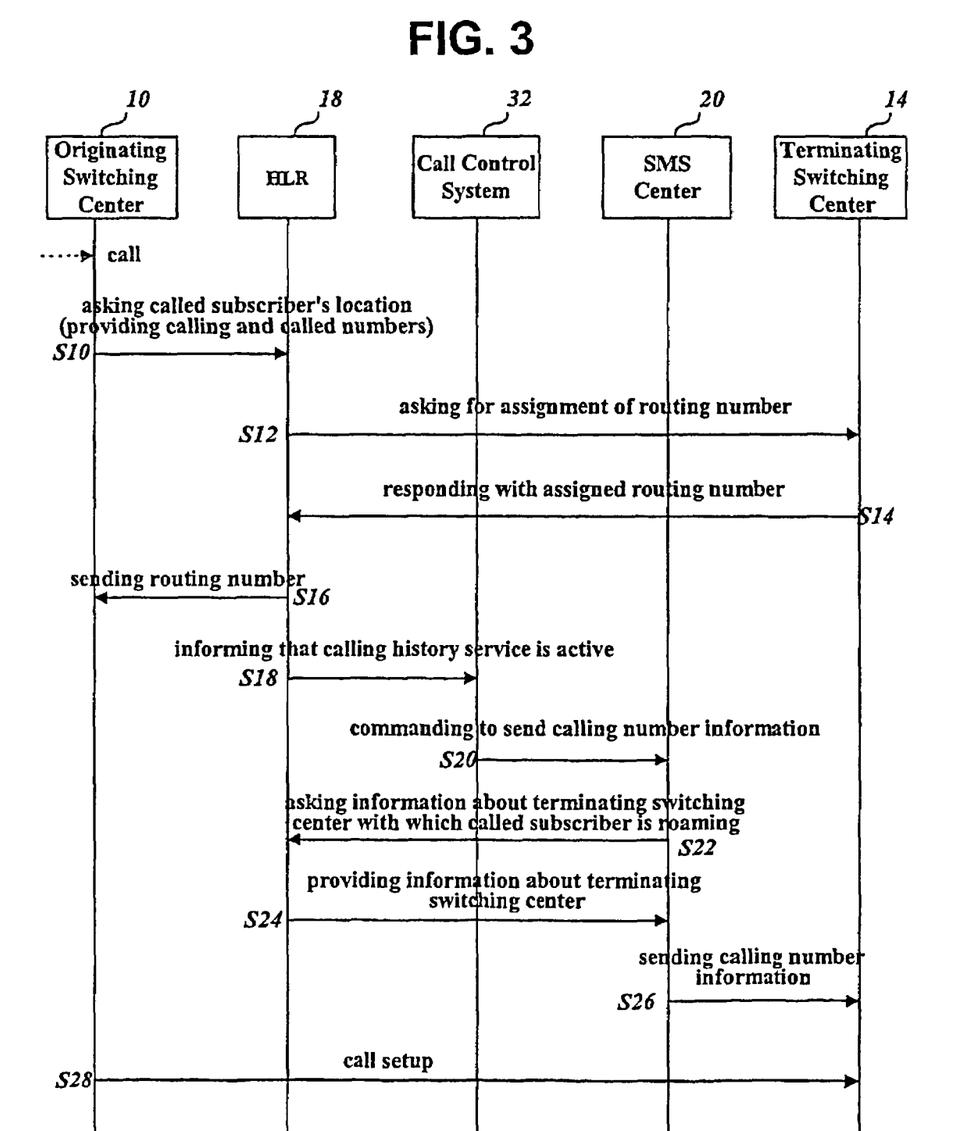
FIG. 3 is a flow diagram in accordance with one embodiment of the present invention, which explains the process of providing calling history information when a called subscriber is in an idle state.

FIG. 3 is a flow diagram of the method for providing a calling history in accordance with an embodiment of the invention, in which a called subscriber's mobile terminal is in an idle state.

If a caller presses the 'send' button on his or her mobile terminal after entering a targeted subscriber's number, a corresponding signal is transmitted to a nearby switching center, for example 10, through a base station. To obtain the called subscriber's roaming location, the originating switching center 10 sends a HLR, e.g., the HLR 18, the calling and called numbers and requests the called subscriber's location (S10). The HLR 18 receives the call originating time together with the calling and called numbers.

The HLR 18 examines if the calling history service is active for the called subscriber by searching the called subscriber's profile based on the called number. If active, to obtain a temporary local directory number (TLDN) or routing number of the terminating switching center, the HLR 18 requests the terminating switching center, for example 14, to assign a routing number (S12).

The terminating switching center 14, responsive to the request, assign a routing number and sends the routing number to the HLR 18 (S14). Receiving the routing number, the HLR 18 sends the routing number back to the originating switching center 10 (S16)

Since the calling history service is active for the called subscriber, the HLR 18 provides the call control system 32 with the information indicating that calling history service is active for the called subscriber along with the called number and calling number information such as the calling number and call originating time (S18). Then the call control server 26 in the call control system 32 makes the provided information stored in an area reserved for the called subscriber in the database 28.

Receiving the information, the call control system 32 searches the additional service information of the called subscriber to provide the calling number information. Subsequently, the call control system 32 provides the short message service center 20 with the calling number and relevant information and commands the short message service center 20 to send the calling number information to the called subscriber (S20).

To send the short message, the short message service center 20 asks the HLR 18 corresponding to the number of the called subscriber, for example 18, for the information about the switching center with which the called subscriber is roaming (S22).

The HLR 18, responsive to the request, sends the information on the terminating switching center to the short message service center 20 (S24). Receiving the information, the short message service center 20 sends the terminating switching center, say 14, the calling number information including the calling number and call originating time (S26).

The originating switching center 10 performs a call setup toward the terminating switching center 14 based on the TLDN (S28).

The steps S20 through S26 are executed only when the calling history service is active for the called subscriber and the step S28 is executed independently of the steps S18 through S26.

Figure 4:
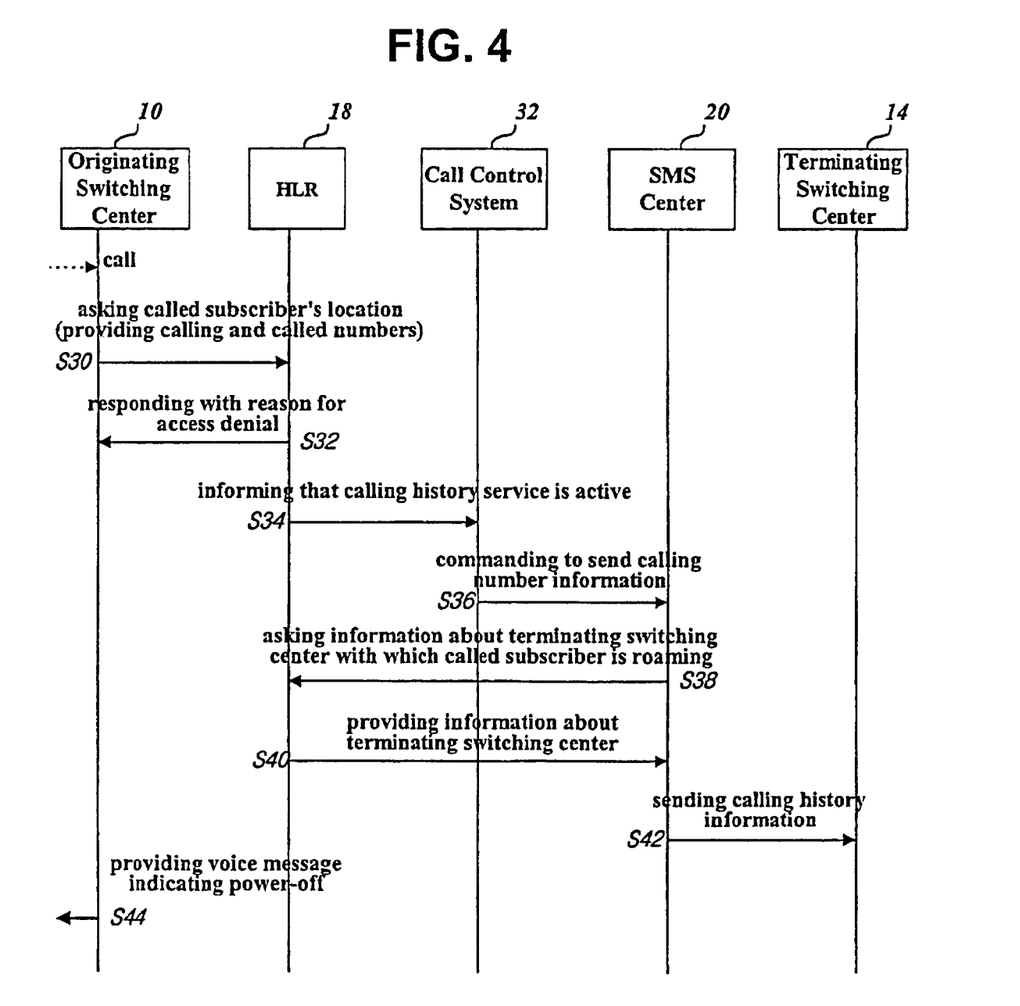
FIG. 4 is a flow diagram in accordance with another embodiment of the present invention, which explains the process of providing calling history information when a called subscriber's mobile terminal is in a power-off state.

FIG. 4 is a flow diagram of the method for providing a calling history in accordance with another embodiment of the invention, in which a called subscriber's terminal is in a power-off state.

If a caller presses the 'send' button on his or her mobile terminal after entering a targeted subscriber's number, a corresponding signal is transmitted to a nearby switching center, for example 10, through a base station. To obtain the called subscriber's roaming location, the originating switching center 10 sends a HLR, for example 18, the calling and called numbers and requests the called subscriber's location (S30). The HLR 18 receives the call originating time together with the calling and called numbers.

The HLR 18 examines the state of the called subscriber's terminal by searching the called subscriber's profile based on the called number. If the state is power-off, the HLR 18 conducts call services according to predefined priorities. In the event of inaccessible state including power-off, the HLR 18 sends the reason for access denial, which is power-off, to the originating switching center 10. Also, the HLR 18 examines if the calling history service is active for the called subscriber by searching the called subscriber's profile. The examination result is sent together with the reason for the access denial to the originating switching center 10 (S32).

If the calling history service is active for the called subscriber, the HLR 18 provides the call control system 32 with the information indicating that calling history service is active. In this case, the called number and calling number information such as the calling number and call originating time are also provided together with the reason for the access denial, which is power-off. In more detail, the HLR 18 sends the parameters SVID (ServiceID), ADR (Access Denied Reason), called number information DGTSDIAL, and calling number information CNIdigitsBCD contained in ServiceInfoDirective, the operator used for associating the operation of the HLR 18 with that of the call control server 26, to the call control server 26 after setting them properly. In particular the parameter SVID is set to CNHP (Calling history Providing), which indicates that the calling history service is active. Then the call control server 26 makes the calling number, call origination time, and the reason for access denial stored in an area reserved for the called subscriber in the database 28.

Receiving the information indicating that calling history service is active, the called number, the calling number of the failed call, and the reason for the access denial, the call control system 32 searches the additional service information of the called subscriber to provide the calling number and the reason for the access denial and commands the short message service center 20 to send the calling number information to the called subscriber (S36).

To send the short message, the short message service center 20 asks the HLR 18 corresponding to the number of the called subscriber, for example 18, for the information about the switching center with which the called subscriber is roaming (S38). The HLR 18, responsive to the request, sends the information on the terminating switching center to the short message service center 20 (S40).

Receiving the information, the short message service center 20 sends the terminating switching center, say 14, the information about failed calls (S42). In other words, the call control system 32 sends the called subscriber the number of failed calls along with ARS numbers, internet menu access, or a web site address where more detailed information can be obtained through the short message service center 20. To provide the information, the call control system 32 communicates with the short message service center 20 using the SMPP protocol.

In providing the calling history information stored in the database 28, the call control system 32 may provide the calling history information whenever the called subscriber requests the information through the Internet 24 or the mobile internet 24 or may send the information in the form of a short message to the subscriber periodically. In the latter case, the information about the number of failed calls and relevant access information for obtaining more detailed information are provided to the subscriber every 4 or 6 hours, in which the subscriber can modify the notification period.

On detecting that the mobile terminal of the subscriber is turned on, the HLR 18 notifies the call control server 26 in the call control system 32 of the fact that the mobile terminal is in the power-on state. The call control server 26 then may send the number of failed calls and relevant access information to the subscriber using the short message service independently of the user-set notification period. When providing the calling history information, the call control system 32 may provide the reason of each of the failed calls, which is optional.

By the aforementioned method, the subscriber always keeps informed of the number of calls that were not answered and the reason for each of the failed calls.

Based on the message received at the step S32, the originating switching center 10 sends the caller an electronic voice response informing that the called subscriber's terminal is power-off (S44).

The steps S36 through S42 are executed only when the calling history service is active for the called subscriber and the step S44 is executed independently of the steps S34 through S42.

Figure 5:
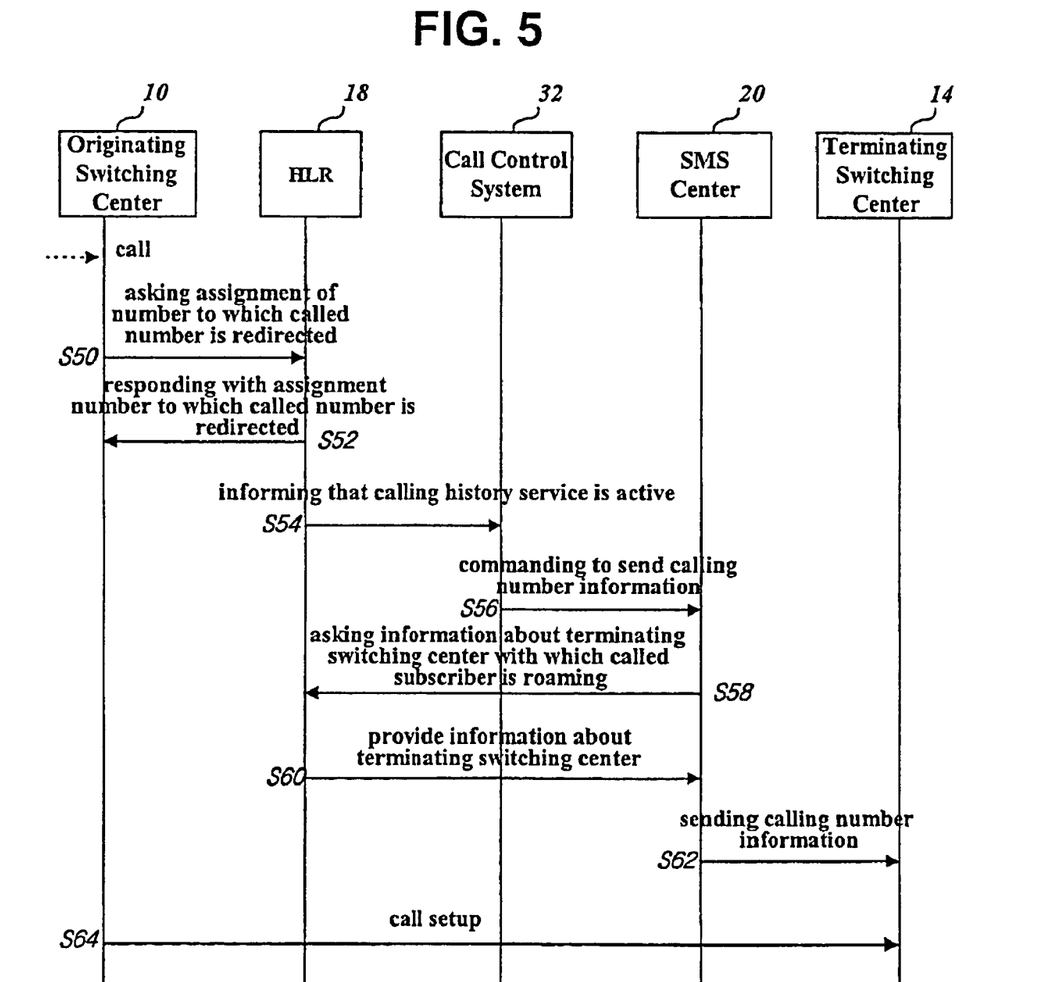
FIG. 5 is a flow diagram in accordance with yet another embodiment of the present invention, which explains the process of providing calling history information when a called subscriber's line is busy, the subscriber is in a not-pageable region, or the subscriber does not answer an incoming call.

FIG. 5 is a flow diagram of the method for providing a calling history in accordance with yet another embodiment of the invention, in which a called subscriber is using the terminal, in a not-pageable region, or does not answer an incoming call.

The flow diagram in FIG. 5 assumes that the originating switching center is connected with the terminating switching center after receiving a TLDN from the HLR when the called subscriber is in the idle state in the flow diagram of FIG. 3, that is, the trunk connection between the originating switching center 10 and the terminating switching center 14 has been completed.

If the called subscriber's line is busy, the subscriber does not answer the call, or the subscriber's terminal is in a not-pageable region, the calling or terminating switching center is supposed to perform an operation of requesting the assignment of a number to which the called number is be redirected. This is because if a call setup to a number, for example 000-111-2222, fails, the call needs to be redirected to another related number, for example 000-111-3333.

In other words, if when a calling subscriber starts a call, the called subscriber's line is busy, the subscriber does not answer the call, or the subscriber's terminal is in a not-pageable region, the originating switching center, say 10, requests the HLR 18 to assign a number to which the called number is to be redirected (S50).

When asking the assignment of the number to which the called number is to be redirected, the originating switching center 10 provides the calling and called numbers and the reason for the access denial to the HLR 18.

The HLR 18, receiving the request, sends the corresponding digits information to the originating switching center 10 (S52).

The HLR 18 examines if the calling history service is active for the called subscriber by searching the called subscriber's profile based on the called number. If the calling history service is active for the called subscriber, the HLR 18 provides the call control system 32 with the information indicating that calling history service is active (S54).

In this case, the called number and calling number information such as the calling number and call originating time are also provided together with the reason for the access denial, which is busy line, not-pageable region, or no answer. In more detail, the HLR 18 sends the parameter SVID (ServiceID), RedirectionReason, called number DGTSDIAL, and calling number CNIdigitsBCD to the call control system 32 after setting them properly. The parameter RedirectionReason is set to H'01 (busy), H'02 (NoAns), or H'04 (NPR) depending on the called subscriber's state. Then the call control server 26 makes the calling number, call origination time, and the reason for access denial stored in an area reserved for the called subscriber in the database 28.

Receiving the information indicating that calling history service is active, the called number, the information about the failed calls, and the reason for the access denial, the call control system 32 searches the additional service information of the called subscriber to provide the calling number and the reason for access denial and commands the short message service center 20 to send the calling number information to the called subscriber (S56).

To send the short message, the short message service center 20 asks the HLR 18 corresponding to the number of the called subscriber, for example 18, for the information about the switching center with which the called subscriber is roaming (S58). The HLR 18, responsive to the request, sends the information on the terminating switching center to the short message service center 20 (S60). Receiving the information, the short message service center 20 sends the terminating switching center, say 14, the calling number information including the calling number and call originating time (S62). In other words, the call control system 32 sends the called subscriber the number of failed calls along with ARS numbers, internet menu access, or web site address where more detailed information can be obtained through the short message service center 20. To provide the information, the call control system communicates with the short message service center 20 using the SMPP protocol. In providing the calling history information stored in the database 28, the call control system 32 may provide the calling history information whenever the called subscriber requests the information through the Internet 24 or the mobile internet 24 or may send the information in the form of a short message to the subscriber periodically. In the latter case, the information about the number of failed calls and relevant access information for obtaining more detailed information are provided to the subscriber every 4 or 6 hours, in which the subscriber can modify the notification period. When providing the calling history information, the call control system 32 may provide the reason of each of the failed calls, which is optional.

By the aforementioned method, the subscriber always keeps informed of the number of calls that were not answered and the reason for each of the failed calls.

The originating switching center 10 performs a call setup toward the terminating switching center 14 based on the TLDN afterwards (S64).

The steps S56 through S62 are executed only when the calling history service is active for the called subscriber and the step S64 is executed independently of the steps S54 through S62.

The above embodiments of the invention are applicable to any type of core network such as the current CDMA2000 network or IMT-2000 network.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

The invention claimed is:

1. An apparatus for providing calling history, the apparatus comprising:

a call control server for managing calling history information about failed calls that attempted to reach a subscriber and providing said calling history information for a mobile terminal of the subscriber, said calling history information being received from a home location register (HLR) through communications between the call control server and the HLR; and a storage, controlled by said call control server, for storing said calling history information provided by said HLR;

wherein said call control server is adapted (a) to create, based upon said calling history information stored in said storage, a short message containing (i) the number of failed calls and (ii) access information on how to obtain detailed information of each of the failed calls, and (b) to send the short message to the mobile terminal of the subscriber.

2. The apparatus set forth in claim 1, wherein said detailed information includes calling and called numbers, call originating times, and the reason for each of the failed calls.

3. The apparatus set forth in claim 2, wherein said reason for each of the failed calls is selected from the group consisting of power-off of the subscriber's terminal, busy line, not-pageable region, and no answer.

4. The apparatus set forth in claim 2 wherein said call control server is adapted to communicate with said HLR using the TCP/IP-based MAP protocol.

5. The apparatus set forth in claim 4, wherein a message used for communication between the call control server and HLR comprises a message header area for storing information comprising at least one of a message version ID, a linked ID, a message type, a service ID, a subsystem, an operation code, a prefix, a service provider ID, a context ID, a source ID, a time stamp, and a message length, and a data area for storing said calling history information.

6. The apparatus set forth in claim 2, wherein said access information is selected from the group consisting of a telephone number of an ARS (Automated Response System) apparatus, an internet menu access, and a network address of a web server.

7. The apparatus set forth in claim 6, wherein said call control server is adapted to send said short message as soon as said call control server detects the mobile terminal of the subscriber is turned on via communication with said HLR.

8. The apparatus set forth in claim 6 further comprising the web server for providing said calling history information stored in said storage for the subscriber connected with the Internet, in conjunction with said call control server.

9. The apparatus set forth in claim 8, wherein every time a request for the calling history information about failed calls is received through said web server, said call control server is operable to provide the stored calling history information about each of the failed calls through said web server.

10. The apparatus set forth in claim 1, wherein said call control server is adapted to send the short message to the mobile terminal of the subscriber through a short message server.

11. A method of providing calling history, the method comprising the steps of:
- a home location register's detecting the failure of a call that attempted to reach a subscriber from a terminating switching center;
- said home location register's sending calling history information of the failed call to a call control system;
- said call control system's classifying and storing the received calling history information according to subscribers;
- said call control system's creating, based upon the stored calling history information, a short message which contains (i) the number of failed calls for the corresponding subscriber and (ii) access information on how to obtain detailed information of each of the failed calls; and
- said call control system's sending the short message to the mobile terminal of the corresponding subscriber.

12. The method set forth in claim 11, wherein said detailed information includes calling and called numbers, call originating times, and the reason for each of the failed calls.

13. The method set forth in claim 12, wherein said access information is selected from the group consisting of a telephone number of an ARS (Automated Response System) apparatus, an internet menu access, and a network address of a web server.

14. The method set forth in claim 13, wherein
said call control system repeatedly sends the short message to the mobile terminal of the corresponding subscriber at regular intervals, after detecting the mobile terminal of the corresponding subscriber is turned on via communication with said home location register.

15. The apparatus set forth in claim 6, wherein
said call control server is adapted to periodically create the short message and repeatedly send the short message to the mobile terminal of the subscriber at regular intervals.

* * * * *